United States Patent [19]

Sasaki et al.

[11] 4,134,812

[45] Jan. 16, 1979

[54] METHOD OF MANUFACTURING SHAPED ARTICLES OF CROSS-LINKED POLY-α-OLEFIN COMPOSITION BY IRRADIATION OF ELECTRON BEAM

[75] Inventors: Takashi Sasaki, Takasaki; Kunio Araki, Mito; Miyuki Hagiwara, Maebashi; Hayao Ishitani, Hiratsuka; Eisuke Saito, Kamakura; Kyoji Komatsu, Yokosuka, all of Japan

[73] Assignees: The Furukawa Electric Co., Ltd.; Japan Atomic Energy Research Institute, both of Tokyo, Japan

[21] Appl. No.: 860,569

[22] Filed: Dec. 14, 1977

[30] Foreign Application Priority Data

Dec. 28, 1976 [JP] Japan ............................. 52-157749

[51] Int. Cl.$^2$ .............................................. C08F 8/00
[52] U.S. Cl. .................................. 264/25; 204/159.15; 204/159.17; 260/45.85 B; 260/875; 260/879; 260/897 A; 260/887; 427/44; 427/117
[58] Field of Search ...................... 204/159.17, 159.15; 260/875, 879, 887, 897; 427/117, 44

[56] References Cited

U.S. PATENT DOCUMENTS

| 3,816,284 | 6/1974 | Kagiya et al. ............... 204/159.17 |
| 3,835,004 | 9/1974 | Kagiya et al. ............... 204/159.17 |
| 3,894,928 | 7/1975 | Kagiya et al. ............... 204/159.17 |
| 3,923,621 | 12/1975 | Murayama et al. ............ 204/159.17 |
| 3,940,325 | 2/1976 | Hirao ........................... 204/159.2 |

Primary Examiner—Richard B. Turer
Attorney, Agent, or Firm—Flynn & Frishauf

[57] ABSTRACT

A method of manufacturing shaped articles of cross-linked poly-α-olefin composition by irradiation of electron beam which comprises the steps of blending a poly-α-olefin with a compound miscible therewith which is expressed by the general formula:

$$X-Y_m$$

(where X is a group free from acetylenic linkage, Y is a group containing acetylenic linkage and m is an integer of 1 or over) and tetrakis-[methylene-(3,5-di-t-butyl-4-hydroxy-hydrocinnamate)]-methane; molding the blended mass into a desired shape; and cross-linking said shaped articles by irradiation of electron beam.

8 Claims, No Drawings

METHOD OF MANUFACTURING SHAPED ARTICLES OF CROSS-LINKED POLY-α-OLEFIN COMPOSITION BY IRRADIATION OF ELECTRON BEAM

This invention relates to improvements on a method of manufacturing shaped articles of cross-linked poly-α-olefin composition by irradiation of electron beam which comprises molding poly-α-olefin composition into a desired shape, cross-linking the shaped articles by irradiation of electron beam, thereby producing, for example, an electric cable insulated with the cross-linked poly-α-olefin composition or hollow pipes of said composition. Namely, this invention has the advantages of eliminating difficulties resulting from accumulation of electric charges in shaped poly-α-olefin composition during the irradiation of electron beam; suppressing the foaming of said shaped articles caused by heat build-up during irradiation of electron beam; and sufficiently cross-linking the shaped articles by an irradiation of only a small amount of dose.

The process of irradiating electron beam to cross-link shaped articles of a highly workable poly-α-olefin composition to improve its mechanical and chemical properties has been found effective from the standpoint of producing a desired article from a relatively inexpensive material with elevated additional merit. In recent years, therefore, this process is practically utilized in the manufacture of insulated electric wires and plastic films.

Rapid development has been made particularly in an electron beam accelerator used for the cross-linking of a polymer, leading to a decline in the cost of irradiating electron beam for said cross-linking. Consequently, the above-mentioned electron beam-radiating process is expected to be more widely put to practical use.

However, there were some cases in which the process of cross-linking a polymer by applying electron beam gave some noticeable difficulties which are scarcely seen in the cross-linking of a polymer by any other form of radiation. For instance, irradiation of electron beam considerably deteriorated some of the properties of a polymer thus cross-linked. Unless, therefore, such difficulties are resolved, there is little hope of the electron beam process being practically used.

In order to introduce sufficient cross-linkage into polymer by irradiating it with electron beam, the polymer is required to be irradiated with a large total dose of electron beam. This unavoidably leads to the evolution of hydrogen gas from the polymer. Furthermore during the irradiation of electron beam, heat build-up arises in the polymer. The generation of hydrogen gas and temperature rise due to heat build-up cause the foaming of the poly-α-olefin. Where, therefore, shaped articles of the poly-α-olefin are irradiated up to a large dose, or the said articles themselves are heated before the irradiation of electrom beam, then said shaped articles are undesirably foamed during said irradiation, rendering the final product disqualified for practical applications.

The sufficient cross-linking of, for example, polyethylene insulation layer of an insulated power cable by application of electron beam generally requires a larger dose than 30 Mrad. In this case, if made thicker than 4mm, the polyethylene insulation layer will unavoidably be foamed.

In addition to the above-mentioned problems, an application of electron beam has adverse effects on the quality of poly-α-olefin shaped articles such as deterioration of electric characteristics and local concentrations of stresses. The reason has proved to be that accelerated electrons implanted in the polymer and in consequence electric charges are accumulated in a certain distribution along the passages through which the accelerated electron are moved in shaped articles.

It is well-known that where the poly-α-olefin shaped articles have a larger thickness than, for example, 0.5mm or an electron beam accelerator has an accelerating energy of 1.0 MeV or more, then the poly-α-olefin shaped articles irradiated by electron beam at such a higher dose rate than $10^4$ rad/sec are subject to suffer from a partial discharge breakdown (generally referred to as "Lichtenberg's breakdown") since electric charges are accumulated in the polymer, leading to a decline in the electric and mechanical properties of said shaped articles. A molded insulation layer of a power cable in which the Lichtenberg's breakdown occurs fails to act as such. Further, hollow pipes or tubes in which the Lichtenberg's breakdown takes place become easily breakable due to a decline in mechanical strength. The Lichtenberg's breakdown is noticeable particularly in an acrylic resin molding.

The foaming in a poly-α-olefin irradiated by electron beam and the accumulation of electric charges in the polymer during irradiation of electron beam display the opposite tendencies with respect to the temperature of said shaped articles. Namely, where temperature of poly-α-olefin shaped articles is high, then foaming appears in the polymer, but accumulation of electric charges does not arise therein. Conversely where temperature of poly-α-olefin shaped articles is as low as room temperature, electric charges are accumulated in the polymer, but foaming does not occur therein. Intermittent irradiation of electron beam on a polymer or blending of a cross-linking reagent therewith has been proposed as an effective way to suppress the foaming of the poly-α-olefin shaped articles. However, neither of these proposed processes has resolved the problem of accumulation of electric charges in the polymer and the Lichtenberg's breakdown thereof.

The mechanism by which electric charges are accumulated in a polymer irradiated by electron beam has not yet been clarified. If a method is discovered for fundamental resolution of this problem, then it will make a prominent contribution to the manufacture of a polymer shaped articles cross-linked by irradiation of electron beam.

The present inventors previously studied a process of suppressing accumulation of electric charges in a polymer irradiated by electron beam and found that blending a thermoplastic resin with an aromatic sec-amine compound and an acetylenic compound acting as a cross-linking reagent resulted in significantly less electric charges, and filed a patent application some time ago. The inventors further studied improvements on the process of eliminating accumulation of electric charges in a polymer particularly in a poly-α-olefin, and has accomplished this invention by the discovery that substitution of a chemical compound of tetrakis-[methylene(3,5-di-t-butyl-4-hydroxy-hydrocinnamate)]-methane for the aforesaid aromatic sec-amine compound attains the same effect as the latter compound.

Namely, the method of this invention for manufacturing shaped articles of cross-linked poly-α-olefin by irradiation of electron beam comprises the steps of blending a poly-α-olefin with the above-mentioned tetrakis-[methylene-(3,5-di-t-butyl-4-hydroxy-hydrocinnamate)]-methane and a compound which is miscible with said poly-α-olefin and is expressed by the general formula:

$$X-Y_m \quad (1)$$

(where X is a group free from acetylenic linkage, Y is a group containing acetylenic linkage, and m is an integer of 1 or over); and irradiating electron beam on shaped articles of the blended mass at a higher dose rate than $10^4$ rad/sec.

The method of this invention has the advantages of not only prominently reducing accumulation of an electric charge in polymer shaped articles cross-linked by irradiation of electron beam, but also considerably promoting the cross-linking reaction of the polymer. Hereinafter, the aforesaid chemical compound of tetrakis-[methylene-(3,5-di-t-butyl-4-hydroxy-hydrocinnamate)]-methane is referred to as "a compound A," and a compound expressed by the general formula (1) is referred to as "an acetylenic compound."

The present invention which has been accomplished by the above-mentioned finding attains a desired object due to the advantages of eliminating the Lichtenberg's breakdown of shaped articles of a poly-α-olefin during cross-linking by irradiation of electron beam; sufficiently cross-linking the shaped articles at a relatively small dosage; and also suppressing the foaming of shaped articles caused by heat build-up therein during irradiation of electron beam.

The above-mentioned compound A gives prominent resistance against thermal aging to shaped articles of a poly-α-olefin composition irradiated by electron beam like the previously proposed aromatic sec-amines and does not color the shaped articles or bleed on to the surface of the shaped articles as has been observed in some forms of the aromatic sec-amines, thereby enabling the cross-linked molding to display more excellent properties.

The compound A can essentially suppress the accumulation of electric charges in shaped articles of not only a poly-α-olefin but also any other thermoplastic resin. This advantageous effect of the compound A becomes prominent particularly in shaped articles of the poly-α-olefin.

As used herein, the term "electron beam" is defined as accelerated electron beam having energies of 1.0 MeV or more. The dose rate of said electron beam is chosen to range between $10^2$ rad/sec and $10^9$ rad/sec. Industrially preferred, however, is the range from $10^4$ rad/sec to $10^7$ rad/sec in consideration of, for example, the efficiency of irradiation and the prevention of heat build-up.

The term "poly-α-olefins," as used herein, is defined to include, for example, polymers of olefin monomers such as ethylene, propylene, 1- and 2-butene, 1-decene and styrene; polymers of diene monomers such as butadiene, and isoprene; copolymers such as ethylene-propylene copolymer and ethylene-vinyl acetate copolymer; mixtures of the above-listed compounds; and also said α-olefins blended, if necessary, with additives such as a reinforcing agent, lubricant, plasticizer, ultraviolet absorber, antistatic agent and pigment.

As used herein, the "acetylenic compounds" which are expressed by the general formula:

$$X-Y_m$$

(where X is a group free from acetylenic linkage, Y is a group containing acetylenic linkage, and m is an integer of 1 or over) are defined to include, for example, acetylene derivatives which are expressed by the general formula:

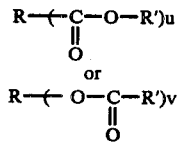

where R is an aromatic hydrocarbon, an aliphatic hydrocarbon, an aliphatic hydrocarbon containing an ether-bond or sulfide bond or an aromatic or aliphatic radical containing a substituent of a hydroxy-, methoxyamine-, nitril-, chloro-, bromo- or fluoro- radical: R' is an alkynyl radical; u is an integer of 1 or over or preferably 1 to 3; v is an integer of 1 or over or preferably 1 to 3 (R has the same number of bonds as u or v) and which is miscible with poly-α-olefin and have a high boiling and decomposition point and moreover prominently accelerate the cross-linking of shaped articles of the poly-α-olefin by irradiation of electron beam and suppress accumulation of electric charges in shaped articles irradiated by electron beam.

The acetylenic compounds concretely include propargyl methacrylate, propargyl crotonate; propargyl linolenate, 3-butynyl methacrylate, 3-butynyl linolenate, dipropargyl succinate, dipropargyl 2-chlorosuccinate, dipropargyl glutarate, dipropargyl adipate, dipropargyl suberate, dipropargyl fumarate, dipropargyl maleate, dipropargyl l-malate, dipropargyl sebacate, dipropargyl pimelate, dipropargyl azelate, dipropargyl itaconate, dipropargyl citraconate, dipropargyl phthalate, dipropargyl 2-methoxyphthalate, dipropargyl isophthalate, dipropargyl terephthalate, dipropargyl 3-methylphthalate, tripropargyl 1,2,3-propane-tricarboxylate, tripropargyl trimellitate, tripropargyl trimesate, di-3-butynyl succinate, di-3-butynyl maleate, di-3-butynyl phthalate, tri-3-buthnyl trimellitate, tetrapropargyl pyromellitate, stearyl propiolate, phenyl propiolate, allyl propiolate, dimethylene dipropiolate, trimethylene dipropiolate, tetramethylene dipropiolate, hexamethylene dipropiolate, octamethylene dipropiolate, propyleneglycol dipropiolate, resorcin dipropiolate, catechol dipropiolate, 2-chlorocatechol dipropiolate, glycerin-1,3-dipropiolate, hydroquinone dipropiolate, dimethylene diethynyl acetate, glycerin tripropiolate, diethyleneglycol dipropiolate, trimethylolpropane tripropiolate, and pentaerythrityl tetrapropiolate.

Preferred among the above-listed compounds are esters of acetylene alcohol and polyhydric carboxylic acid and also esters of acetylene series carboxylic acid and polyhydric alcohol, both forms of esters having a high boiling point and decomposition temperature. More preferred are dipropargyl maleate, dipropargyl succinate, dipropargyl fumarate, dipropargyl terephthalate, dipropargyl isophthalate, dipropargyl sebacate, tripropargyl trimesate, tetramethylene dipropiolate, hexamethylene dipropiolate, hydroquinone dipropiolate, catechol dipropiolate, diethyleneglycol dipropiolate. Most desired among the above-listed compounds are dipropargyl maleate and dipropargyl succinate. Acetylene gas is not available for use, because it is not only little miscible with a poly-α-olefin due to its own gaseous condition, but also gives rise to the formation of an explosive product by reaction with heavy metals. Addition of an acetylenic compound to a poly-α-olefin as a cross-linking reagent is not subject to any particular limitation. However, the preferred range of said addition is chosen to be 0.1 to 10 parts by weight on the basis of 100 parts by weight of the poly-α-olefin for crystalline polymers of low compatibility such as polyethylene and polypropylene and vitreous polymers, and 1 to 50 parts by weight on the basis of 100 parts by weight of the poly-α-olefin for elastomers of high compatibility such as ethylene-vinyl acetate copolymer and ethylene-propylene copolymer, and plasticizable vitreous polymers.

The reason why a lower limit to addition of the above-mentioned cross-linking reagent is set at 0.1 part by weight for crystalline polymers of low compatibility and 1 part by weight for elastomers of high compatibility is that shaped articles of poly-α-olefin composition containing a smaller amount of the cross-linking reagent than the above-mentioned lower limit are not prominently cross-linked when irradiated by electron beam. The reason why an upper limit to addition of the cross-linking reagent is set at 10 parts by weight for crystalline polymers of low compatibility and 50 parts by weight for elastomers of high compatibility is that the former upper limit is defined in view of the maximum compatibility of the cross-linking reagent to the corresponding polymers, and the latter upper limit is determined in consideration of the economy of the blended composition.

The compound A, that is tetrakis-[methylene-(3,5-di-t-butyl-4-hydroxy-hydrocinnamate)]-methane which, according to the method of this invention, is added to shaped articles of a poly-α-olefin composition to suppress accumulation of electric charges in said shaped articles when irradiated by electron beam is expressed by the general formula:

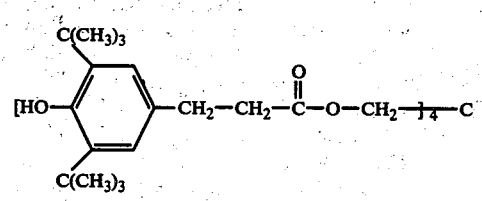

When added alone to the poly-α-olefin composition, the compound A gives rise to resonance stabilization due to the inclusion of an aromatic group in the molecule of said compound A, thereby tending slightly to restrict a cross-linking reaction resulting from irradiation of electron beam. However, application of both compound A and acetylenic compound not only minimizes the restriction of cross-linking reaction and prevents accumulation of electric charges in shaped articles of the poly-α-olefin composition when irradiated by electron beam, but also suppresses the thermal deterioration of said shaped articles. Addition of the compound A is not subject to any particular limitation. Where, however, the compound A is applied in a smaller amount than 0.1 part by weight on the basis of 100 parts by weight of the poly-α-olefin, then such addition is little effective. Conversely where the compound A is added in a larger amount than 2 parts by weight on the same basis, then such addition is accompanied with the drawbacks of not only failing more prominently to suppress accumulation of electric charges, but also conversely more positively restricting said cross-linking reaction, and in some cases the compound A bleeds on to the surface of shaped articles of the poly-α-olefin composition. For the above reason, the compound A should preferably be added to the poly-α-olefin in an amount ranging between 0.1 and 2.0 parts by weight on the basis of 100 parts by weight of said polymer.

As used herein, shaped articles of the poly-α-olefin composition are defined to have a larger thickness than 0.5mm and include, for example, hollow pipes, hollow tubes, boards, insulation or protective layers for electric wires and cables and many other shaped articles.

As mentioned above, the method of this invention can manufacture highly cross-linked shaped articles of poly-α-olefin composition with excellent properties, which are free from Lichtenberg's breakdown caused by accumulation of electric charges therein during irradiation of electron beam and from the foaming of said shaped articles due to heat build-up during said irradiation. Therefore, the method of the invention has been proved to be practically very useful.

The invention will be more fully understood by reference to the examples which follow. Throughout the examples and controls, parts are by weight.

EXAMPLES 1 TO 4 AND CONTROLS 1 TO 4

Eight poly-α-olefin compositions were prepared in Examples 1 to 4 and Controls 1 to 4 respectively from low density polyethylene, and selected ones of other components such as diallyl maleate, dipropargyl maleate, thiobis(6-t-butyl-3-methylphenol) and tetrakis-[methylene-(3,5-di-t-butyl-4-hydroxy-hydrocinnamate)]-methane used in proportions given in Table 1 below on the basis of 100 parts by weight of the low density polyethylene. The blended composition was uniformly kneaded on a hot roll, and press-molded into a sheet of 3mm thick. Electron beam were continuously irradiated on the sheet in the open air at the dose rate of $1 \times 10^5$ rad/sec by an electron beam accelerator having an accelerating energy of 1 MeV. Irradiation dose to the sheet, the degree of cross-linking (expressed in gel fraction), occurrence of foaming, temperature at which oxidative decomposition begins (measured by a differential scanning calorimeter abbreviated as DSC) and the observation for the Lichtenberg's figure, are listed in Table 1 below.

Table 1

| Components and items of determination | Examples | | | | Controls | | | |
|---|---|---|---|---|---|---|---|---|
| | 1 | 2 | 3 | 4 | 1 | 2 | 3 | 4 |
| Low density polyethylene | parts 100 | parts 100 | parts 100 | parts 100 | parts 100 | parts 100 | parts 100 | parts 100 |
| Diallyl maleate | — | — | — | — | — | — | 5 | — |
| Dipropargyl maleate | 2 | 2 | 0.5 | 7 | — | — | — | 2 |
| Thiobis(6-t-butyl-3-methylphenol) | — | — | — | — | — | 0.3 | — | — |
| Tetrakis-[methylene-(3,5-di-t-butyl-4-hydroxy-hydrocinnamate)]-methane | 0.5 | 1.0 | 0.2 | 1.5 | — | — | — | — |
| Irradiation dose (Mrad) | 20 | 20 | 20 | 10 | 30 | 55 | 25 | 20 |
| Gel fraction (%)*1 | 83 | 82 | 80 | 85 | 83 | 84 | 81 | 81 |

Table 1-continued

| Components and items of determination | | Examples | | | | Controls | | | |
|---|---|---|---|---|---|---|---|---|---|
| | | 1 parts | 2 parts | 3 parts | 4 parts | 1 parts | 2 parts | 3 parts | 4 parts |
| Low density polyethylene | | 100 | 100 | 100 | 100 | 100 | 100 | 100 | 100 |
| Foaming*2 | | None | None | None | None | None | Noticed | None | None |
| Oxidation*3 temperature (°C) measured by DSC | Before irradiation | 245 | 252 | 235 | 256 | 220 | 285 | 220 | 220 |
| | After irradiation | 243 | 252 | 231 | 255 | 220 | 250 | 220 | 220 |
| Lichtenberg's figure | | None | None | None | None | Noticed | Noticed | Noticed | Noticed |

*1 Extracted with boiling xylene for 100 hours.
*2 "Noticed" denotes the sheet irradiated by electron beam in which voids having a larger diameter than 50 microns were observed. "None" shows a sheet irradiated by electron beam in which voids having a larger diameter than 50 microns were not observed.
*3 Temperature at which an exothermic peak appears in the DSC curve (the higher the temperature, the greater the resistance of the sheet to thermal aging).

As apparent from Table 1 above, neither foaming nor Lichtenberg's breakdown took place in the articles made of poly-α-olefin moldings of Examples 1 to 4, which displayed high resistance to thermal aging. In contrast, the articles made of poly-α-olefin moldings of Controls 1 to 4 which lacked either acetylenic compound or tetrakis-[methylene-(3,5-di-t-butyl-4-hydroxyhydrocinnamate)]-methane gave rise to foaming and Lichtenberg's breakdown and indicated low resistance to thermal aging.

EXAMPLES 5 TO 8 AND CONTROLS 5 TO 7

Poly-α-olefin compositions were selectively prepared from polypropylene, polybutadiene, ethylene-vinyl acetate copolymer, tetramethylene dipropiolate and compound A used in proportions given in Table 2 below. The blended composition was uniformly kneaded on a hot roll, and press molded into a sheet of 3mm thick. Electron beam were intermittently irradiated on the sheet in the open air at the dose rate of $1 \times 10^5$ rad/sec by an electron beam accelerator having an accelerating energy of 1 MeV. A total irradiation dose to the sheet, gel fraction, occurrence of foaming, dielectric breakdown voltage and observation of Lichtenberg's figure, are listed in Table 2 below.

Table 2

| Components and items of determination | Examples | | | | Controls | | |
|---|---|---|---|---|---|---|---|
| | 5 | 6 | 7 | 8 | 5 | 6 | 7 |
| Polypropylene | 100 parts | — | — | — | 100 parts | — | — |
| Polybutadiene | — | 100 parts | — | — | — | 100 parts | — |
| Ethylene-vinyl acetate copolymer | — | — | 100 parts | 100 parts | — | — | 100 parts |
| Tetramethylene dipropiolate | 5 parts | 10 parts | 10 parts | 40 parts | — | — | — |
| Compound A | 0.5 part | 0.5 part | 0.5 part | 1.0 part | — | — | — |
| Total irradiation dose (Mrad) | 20 | 20 | 20 | 20 | 30 | 30 | 30 |
| Gel fraction (%)*1 | 75 | 84 | 84 | 91 | 10 | 80 | 83 |
| Dielectric breakdown voltage (KV/mm) | 72 | 55 | 62 | 60 | 30 | 15 | 15 |
| Foaming*2 | None | None | None | None | None | None | None |
| Lichtenberg's figure | None | None | None | None | Noticed | Noticed | Noticed |

*1 the same as in Table 1.
*2 the same as in Table 1.

EXAMPLES 9, 10 AND CONTROLS 8, 9

Poly-α-olefin compositions were selectively prepared from low density polyethylene, ethylene-propylene copolymer, calcium carbonate, dipropargyl succinate, thiobis(6-t-butyl-3-methylphenol), and compound A in proportions given in Table 3 below. The blended composition was uniformly kneaded on a hot roll, and then pelletized. The pellets having prescribed composition were extruded around a stranded wire as an insulation layer in a thickness of 4mm by an extruder (L/D=22; cylinder diameter=115mm), thereby providing a cable insulated with a polyethylene layer, 12mm in a finished diameter and a cable insulated with an ethylenepropylene copolymer in the same finished diameter.

Electron beam were continuously irradiated on these cables in the open air at the dose rate of $1 \times 10^6$ rad/sec by an electron beam accelerator (2 MeV; 3 mA). A cross-linked insulation layer was sampled from the respective cables. The gel fraction, occurrence of foaming, heat deformation, dielectric breakdown voltage and observation of Lichtenberg's figure, are listed in Table 3 below.

Table 3

| Components and items of determination | Examples | | Controls | |
|---|---|---|---|---|
| | 9 | 10 | 8 | 9 |
| Low density polyethylene | 100 parts | — | 100 parts | — |
| Ethylene-propylene copolymer | — | 100 parts | — | 100 parts |
| Calcium carbonate | — | 80 parts | — | 80 parts |
| Dipropargyl succinate | 2 parts | 10 parts | — | — |
| Thiobis(6-t-butyl-3-methylphenol) | — | — | 0.3 part | 0.3 part |
| Compound A | 0.5 part | 0.5 part | — | — |
| Total irradiation dose (Mrad) | 20 | 20 | 40 | 40 |
| Gel fraction (%)*1 | 82 | 80 | 80 | 79 |
| Foaming*2 | None | None | Noticed | Noticed |
| Heat deformation (%)*3 | 20 | 25 | 30 | 40 |
| Dielectric breakdown voltage (KV/mm) | 85 | 50 | 10 | 10 |

Table 3-continued

| Components and items of determination | Examples | | Controls | |
|---|---|---|---|---|
| | 9 | 10 | 8 | 9 |
| Lichtenberg's figure | None | None | Noticed | Noticed |

*1,*2 the same as in Table 1.
*3 Measured under a load of 5kg at 120° C.

What we claim is:

1. A method of manufacturing shaped articles of cross-linked poly-α-olefin composition by irradiation of electron beam which comprises the steps of blending the poly-α-olefin with a compound which is miscible with the poly-α-olefin and is expressed by the general formula:

X—Ym where X is a group free from acetylenic linkage, Y is a group containing acetylenic linkage, and m is an integer of 1 or over, and tetrakis-[methylene-(3,5-di-t-butyl-4-hydroxy-hydrocinnamate)]-methane; molding the blended mass into a desired shape; and irradiating electron beam on said shaped articles.

2. The method according to claim 1, where the compound which is miscible with the poly-α-olefin and is expressed by the general formula X—Ym is one selected from the group consisting of an ester of acetylene alcohol and polyhydric carboxylic acid and an ester of acetylene series carboxylic acid and polyhydric alcohol.

3. The method according to claim 1, wherein the poly-α-olefin composition is prepared by blending 100 parts by weight of poly-α-olefin as a matrix with 0.1 to 5 parts by weight of the compound expressed by the general formula X—Ym and 0.1 to 2.0 parts by weight of tetrakis-[methylene-(3,5-di-t-butyl-4-hydroxy-hydrocinnamate)]-methane.

4. The method according to claim 1, wherein the poly-α-olefin composition is extruded to shaped articles having thickness of at least 0.5mm.

5. The method according to claim 1, wherein shaped articles of the poly-α-olefin composition are applied as an electric insulation layer on the peripheral surface of an electric conductor.

6. The method according to claim 1, wherein shaped articles of the poly-α-olefin composition are a hollow pipe.

7. The method according to claim 1, wherein electron beam having energies of at least 1.0 MeV are irradiated on shaped articles of the poly-α-olefin composition at a higher dose rate than $10^4$ rad/sec.

8. The method according to claim 1, wherein shaped articles of the poly-α-olefin composition cross-linked by irradiation of electron beam are applied as an electric insulation layer to an electric wire or cable.

* * * * *